Feb. 19, 1952        F. LÖNNE        2,586,674

PROPHYLACTICS

Filed Nov. 6, 1949

INVENTOR
FRIEDRICH LÖNNE

BY *Cushman, Darby & Cushman*

ATTORNEYS

Patented Feb. 19, 1952

2,586,674

UNITED STATES PATENT OFFICE 2,586,674

PROPHYLACTICS

Friedrich Lönne, Dusseldorf, Germany

Application November 16, 1949, Serial No. 127,592
In Switzerland November 19, 1948

6 Claims. (Cl. 128—294)

This invention relates to an improved prophylactic of the type normally employed by many men to prevent the transmission of venereal diseases during intercourse, more particularly the present invention relates to a prophylactic formed of thin membranes or pellicles made from rubber and adapted to be drawn over the penis when erected.

The object of the invention is to provide a new and improved prophylactic ensuring an increased security against tear and rupture when used.

As it is known to those skilled in the art, a prophylactic of this nature must enclose the phallus with a certain tension in such a manner that it will tightly fit when used and cannot be stripped from the membrum. The ejaculated sperma effects an additional expansion of the rubber pellicle already tensioned, thus provoking the danger of a rupture of the pellicle. It has already been proposed, in order to overcome this disadvantage, to provide at the end of the prophylactic a vesicular extension of a smaller diameter than the body of the prophylactic and open to the interior thereof. This extension is intended to receive the ejaculated sperma. A disadvantage of such arrangement, however, is in that the vesicular extension may be bent sharply aside, thus being pressed tightly together at its root so that the interior of the vesicular extension intended as a reservoir becomes inaccessible. Moreover, it is not possible to make the extension large enough so that a dilatation of the pellicle over its elasticity limit will not be prevented in any case.

It is, therefore, a principal object of the present invention to provide a prophylactic wherein a suitable reserve of space is made available to receive the ejaculated sperm without the risk of the pellicle dilating over its elasticity limit on the one hand and without diminishing the close fit of the pellicle to the phallus on the other hand.

Figure 1:
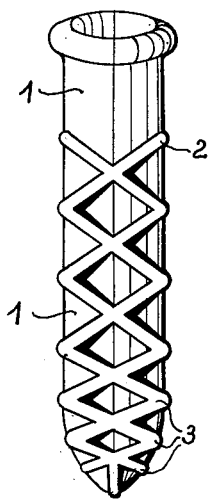
Figure 2:
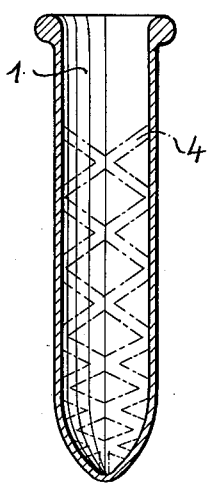
Figure 3:
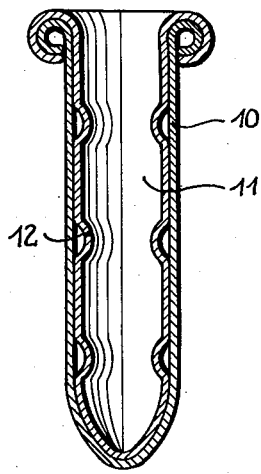

With the above and other objects and features of my present invention in view, I will now describe several preferred embodiments of my invention on the lines of the accompanying drawing, in which Fig. 1 shows a side view of a single-layer prophylactic, Fig. 2 is a vertical section through a part of the prophylactic according to Fig. 1, and Fig. 3 a longitudinal section through a double-layer phophylactic.

In Fig. 1, the rubber body of the prophylactic is provided with projections which have the form of ribs 2, running helically and crossing one another. When the phophylactic is unexpanded, the projections are clearly visible. After the prophylactic has been applied to the membrum, the rubber body will closely and without folds fit the phallus, as indicated in Fig. 2, i. e. the projection zones 4, indicated by dotted lines now are even and follow closely the surface of the membrum. In consequence thereof the rubber body comprises normal zones of tension which exist in the prior art prophylactics and zones of less tension. In those latter zones the rubber body is allowed to dilate when the inner pressure in the prophylactic is increased without the other zones, which are already dilated up to their maximum tension, being subsected to an additional dilatation. It may be assumed that the prophylactic will have the form as indicated in Fig. 1 after ejaculation. The ejaculated sperma collects in the zones 2 of less tension causing these areas to expand outwardly without causing any part of the rubber body to dilate over its elasticity limit.

It may be advantageous to increase the number of projections 2 toward the closed end of the prophylactic as indicated at 3.

In order to further increase safety against total rupture of the prophylactic, according to the present invention one form of rubber pellicle as shown in Fig. 1 or otherwise may be combined with a second pellicle arranged inside the former pellicle and coaxially thereto.

This modification of the invention is shown in Fig. 3. The outer pellicle is indicated by 10, the inner pellicle by 11. The latter one may be provided with annular projections, or extensions 12.

The inner pellicle, however, may be made smooth, i. e. without the above mentioned projections. In this case the outer pellicle is to be dimensioned as the usual single-layer prophylactic and the inner layer is arranged in such a manner that it will unroll simultaneously with the outer layer, when the prophylactic is applied to the male organ. The inner pellicle is then kept closely fitted between the outer pellicle and the penis, the surface of the latter. The inner pellicle has, however, a somewhat greater diameter, and as the case may be, a little greater length than the outer pellicle. In consequence thereof, when using this form of my improved prophylactic, the inner pellicle will show some folds, but these folds do not interfere with the proper functioning of the prophylactic as the rubber pellicle is always kept closely fitted to the surface of the penis and the excess of the rubber material is uniformly distributed. Under certain circumstances the diameter of the inner pellicle may decrease toward the open end of the prophylactic in such a manner that the upper end of the inner pellicle will closely fit the body end of the male organ with sufficient tension so as not to be displaced if the outer pellicle should be broken.

In the intermediate space between the inner and the outer pellicle of the double-layer preservative antiseptics or spermatozocides may be provided for.

The projections 2 arranged in the rubber body of the prophylactic may be of any suitable design. They may run axially or annularly or helically as indicated in the drawings.

The present invention may be utilized in several additional embodiments. According to one modification envisioned, several, and at least two, rubber pellicles may be arranged coaxially, one over the other, so as to form a double prophylactic. In this case the inner of the two pellicles may be provided with a somewhat greater diameter to provide a greater capacity than the outer one. However, the latter is dimensioned so that it will closely fit the membrum and insure the proper position of the prophylactic on the phallus. Should the outer layer of the prophylactic break during use in consequence of a local over-dilation, the inner wider layer then unfolds, thereby allowing additional space for receiving the ejaculated sperm.

The present invention may be further modified so that the rubber body of the prophylactic is comprised of but one pellicle having substantially the same thickness over its entire surface and is provided with projections in the form of ribs or the like in such a way so that in the unextended state of the prophylactic the rubber pellicle will consist of alternating zones of different diameter. According to the invention such zones may have the form of projections running in axial or circumferential or helical direction.

Various changes may be made in the details disclosed in the foregoing specification without departing from the present invention and the scope thereof.

I claim:

1. A prophylactic device comprising a thin rubber tube having an arcuate closed end, with a series of diagonally extending external hollow protrusions extending from the closed end of said tube and terminating adjacent the open end thereof when said device is in its relaxed condition, said protrusions being absorbed into the body of said tube when in use so that the body portion and protrusions combine to yield a smooth, tight fit, said protrusions comprising areas of reduced tension on the surface of said tube when in use to receive the discharged sperm and prevent said tube from being stretched beyond its elastic limit.

2. A prophylactic as claimed in claim 1 wherein the protrusions have the form of rib-like helical lines crossing each other.

3. A prophylactic as claimed in claim 1 wherein a second rubber tube is disposed within said first tube, said second inner tube being of greater diameter than the outer tube.

4. A prophylactic as claimed in claim 3 wherein the inner rubber tube is of greater length than the outer tube.

5. A prophylactic as claimed in claim 3 wherein the inner rubber tube is provided with annular protrusions.

6. A prophylactic as claimed in claim 5 wherein the protrusions on said inner rubber tube are absorbed into the body of said tube when in use to provide a smooth, tight fit, but which are of suficiently reduced tension relative to said body portion of the inner tube so as to be safely capable of further expansion upon the discharge of semen within said inner tube.

FRIEDRICH LÖNNE.

REFERENCES CITED

The following references are of record in the file of this patent:

UNITED STATES PATENTS

| Number | Name | Date |
|---|---|---|
| 1,866,060 | Schmidt | July 5, 1932 |
| 2,285,981 | Johns | June 9, 1942 |

FOREIGN PATENTS

| Number | Country | Date |
|---|---|---|
| 326,719 | Great Britain | Mar. 20, 1930 |
| 593,637 | Germany | Mar. 2, 1934 |